Oct. 20, 1925.
H. H. BASCH
1,558,332
CUSHIONING FENDER FOR VEHICLES
Filed Aug. 15, 1924
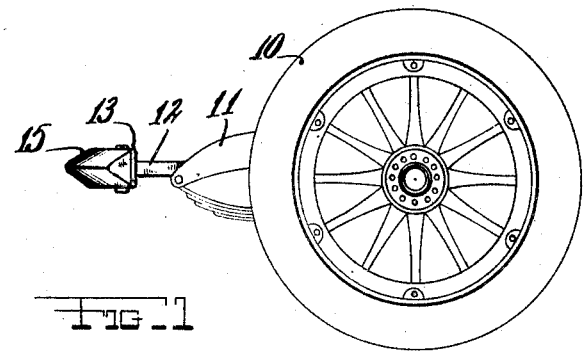
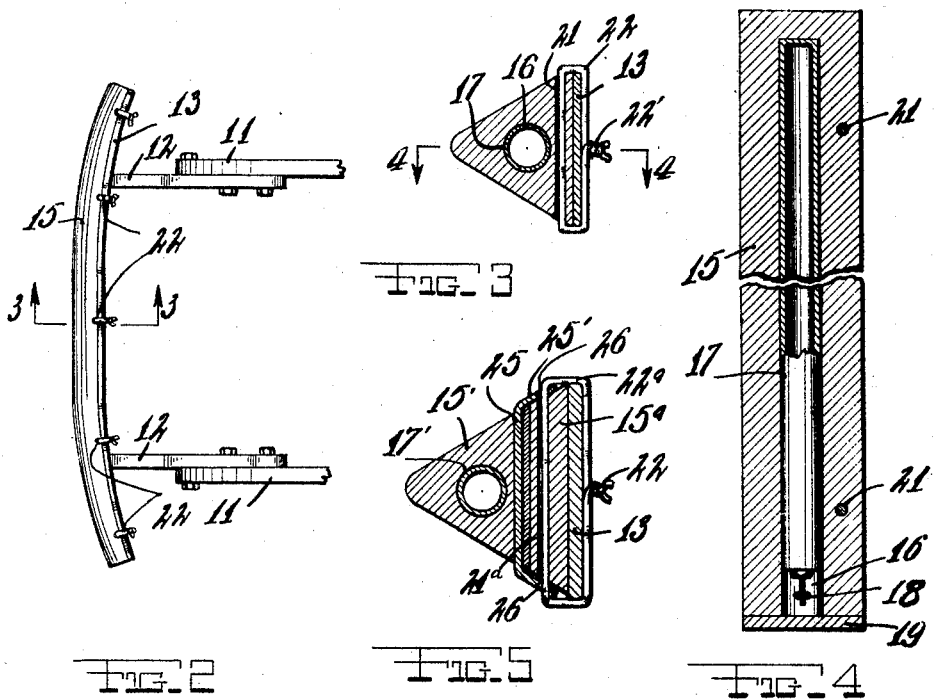
INVENTOR
Henry H. Basch
BY
ATTORNEY Patented Oct. 20, 1925.

1,558,332

UNITED STATES PATENT OFFICE.

HENRY H. BASCH, OF NEW YORK, N. Y.

CUSHIONING FENDER FOR VEHICLES.

Application filed August 15, 1924. Serial No. 732,146.

*To all whom it may concern:*

Be it known that I, HENRY H. BASCH, citizen of United States, residing at New York city, in the county of New York and State of New York, have invented certain new and useful Improvements in Cushioning Fenders for Vehicles, of which the following is a specification.

This invention relates to fenders or bumpers for automobiles, the invention having more particular reference to a cushioning element which may be readily mounted on any ordinary fender bar, the invention having for an object the provision of a novel and improved device of this sort which will reduce danger of injury to objects that may be struck.

For further comprehension of the invention, and of the objects and advantages thereof reference will be had to the following description and accompanying drawing, and to the appended claims in which the various novel features of the invention are more particularly set forth.

Fig. 1 of the drawing is a side view indicating my improved cushioning fender element as mounted on an automobile.

Fig. 2 is a plan view thereof.

Fig. 3 is an enlarged transverse sectional view taken on the line 3—3 of Fig. 2.

Fig. 4 is a longitudinal sectional view of the cushioning fender taken on the line 4—4 of Fig. 3.

Fig. 5 is a similar view to Fig. 3 but showing a modified construction of cushioning fender element.

In the drawing I have shown one of the front wheels of an automobile at 10, the usual side frame members of the chassis of the automobile being indicated at 11. To these frame members the fender may be attached in the usual manner, the fender here shown comprising the usual longitudinal rods 12 which are bolted at their rear ends to these frame members 11 and have attached to their front ends the usual bumper or fender bar 13, my improved cushioning element being applied to the front side of this bar 13.

My improved cushioning element comprises a rubber strip 15 which is equilateral-triangular form in cross section, and is of a width across its base side, equal or substantially equal to the width of the bar 13. This strip has a passage or opener 16 extending longitudinally therethrough substantially therethrough from end to end thereof, this passage being of circular cross section. In this passage I position an inner pneumatic tube 17 which has one end permanently closed and the other end provided with a valve 18 for inflation purposes. The end of the passage 16 adjacent the valve 18 may be closed by a movable flap 19.

In connection with my improved cushioning bumper element I preferably provide means whereby the said element may be readily attached to an ordinary fender bar. As here shown the strip is formed with a number of apertures such as 21 which extend transversely therethrough adjacent and parallel to the side thereof which engages the fender bar. Wires such as 22 may be passed through these openings and bent around the top and bottom edges of the bar 13 and then have their ends twisted together as shown at 22', thereby holding the member 15 in position on the fender bar.

In Fig. 5 of the drawing I have shown a modified construction in which the cushioning element is arranged for application to a larger type of automobile with a wider fender bar. As here shown the strip 15' has passed therethrough a number of metal straps 25 which are bent at their ends as at 25' rearwardly to project beyond the rear edge of the strip. In this arrangement a base element 15$^a$ of frusto-conical cross section is interposed between the strip and the fender bar, this base element being likewise of rubber and extending the full length of the strip. This element 15$^a$ is formed with a number of apertures such as 21$^a$ through which the wires 22$^a$ are passed, these wires also passing through eyes 26 formed in the ends of the straps. These wires are bent around the bar 13' and have their ends twisted together as above described, and it will be obvious that they serve to hold the members 15' and 15$^a$ both in place, the engagement of the bent strap ends with the base element 15$^a$ preventing vertical displacement of the strip 15' with respect to the said base element.

Having thus described my invention, what I claim as new and desire to protect by Letters Patent of the United States is as follows:—

1. A cushioning member for a fender bar comprising a rubber strip arranged for mounting on the said bar, an inner pneumatic tube in said strip, said strip being of triangular cross section, and having a plurality of apertures formed therein, wires passed through said apertures and bent around the top and bottom edges of said bar, and having their outer ends twisted together for holding said member in position on said fender bar.

2. A cushioning member for a fender bar comprising a rubber strip arranged for mounting on the said bar, and an inner pneumatic tube in said strip, said strip being of triangular cross section, and being formed with a number of transverse apertures to receive fastening wires.

3. A cushioning member for a fender bar comprising a rubber strip of triangular cross section extending along the face of the bar, and wires detachably securing said strip to said bar, said bar having a plurality of transverse openings therein through which said wires pass, and said wires having their extreme outer ends twisted for holding said member in position on said fender bar.

4. A cushioning member for a fender bar comprising two rubber strip elements jointly forming a strip of triangular cross section, one of said elements being of frusto-conical cross section and having the other seated thereon, straps passing vertically through the said other section and extending at their ends rearwardly over the top and bottom faces of the first named section, said straps having eyes in their ends, and wires passing vertically through said first named section and through said eyes and engaging around the fender bar to secure the said cushioning member thereto.

In testimony whereof I have affixed my signature.

HENRY H. BASCH.